United States Patent
Harter

(10) Patent No.: US 12,337,677 B2
(45) Date of Patent: Jun. 24, 2025

(54) FIN ARRANGEMENT OF A COOLING AIR OPENING

(71) Applicant: Dr. Ing. h.c. F. Porsche Aktiengesellschaft, Stuttgart (DE)

(72) Inventor: Sebastian Harter, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 369 days.

(21) Appl. No.: 18/086,767

(22) Filed: Dec. 22, 2022

(65) Prior Publication Data
US 2023/0249540 A1    Aug. 10, 2023

(30) Foreign Application Priority Data
Feb. 8, 2022   (DE) ..................... 10 2022 102 889.5

(51) Int. Cl.
*B60K 11/08*   (2006.01)

(52) U.S. Cl.
CPC .................................. *B60K 11/085* (2013.01)

(58) Field of Classification Search
CPC .. B60H 1/3414; B60H 1/3421; B60H 1/3428; B60H 1/3435; B60H 2001/00707; B60H 1/00671; B60H 1/00678; B60H 1/00871
See application file for complete search history.

(56) References Cited

U.S. PATENT DOCUMENTS

| 2,158,413 | A | * | 5/1939 | Feinberg | F24F 13/075 236/49.5 |
| 2,257,007 | A | * | 9/1941 | Harris | F24F 11/76 236/82 |
| 4,628,801 | A | * | 12/1986 | Hashimoto | F24F 13/15 454/285 |
| 4,653,386 | A | * | 3/1987 | Hayakawa | F24F 13/075 454/316 |
| 4,676,146 | A | * | 6/1987 | Takahashi | F24F 13/15 454/153 |
| 5,364,303 | A | * | 11/1994 | Terry | B60H 1/345 454/155 |

(Continued)

FOREIGN PATENT DOCUMENTS

| DE | 102011055394 A1 | 5/2013 |
| DE | 102014114068 A1 | 4/2015 |

(Continued)

*Primary Examiner* — Nelson J Nieves
(74) *Attorney, Agent, or Firm* — Buchanan Ingersoll & Rooney PC

(57) ABSTRACT

A fin arrangement of a cooling air opening with a number of fins. The fins are arranged in a rotatably mounted manner adjacent to the cooling air opening. A drive is directly coupled to a first fin of the fins for directly driving the first fin. The first fin is coupled to at least one second fin of the fins or to a plurality of second fins of the fins for indirectly driving the second fins. A reduction gear or a first coupling mechanism is arranged and connected between the drive and the first fin and/or that a second coupling mechanism is connected between the first directly driven fin and at least one second indirectly driven fin and/or that a third coupling mechanism is connected between at least one second indirectly driven fin and at least one further second indirectly driven fin.

13 Claims, 5 Drawing Sheets

(56) References Cited

U.S. PATENT DOCUMENTS

Figure 1:
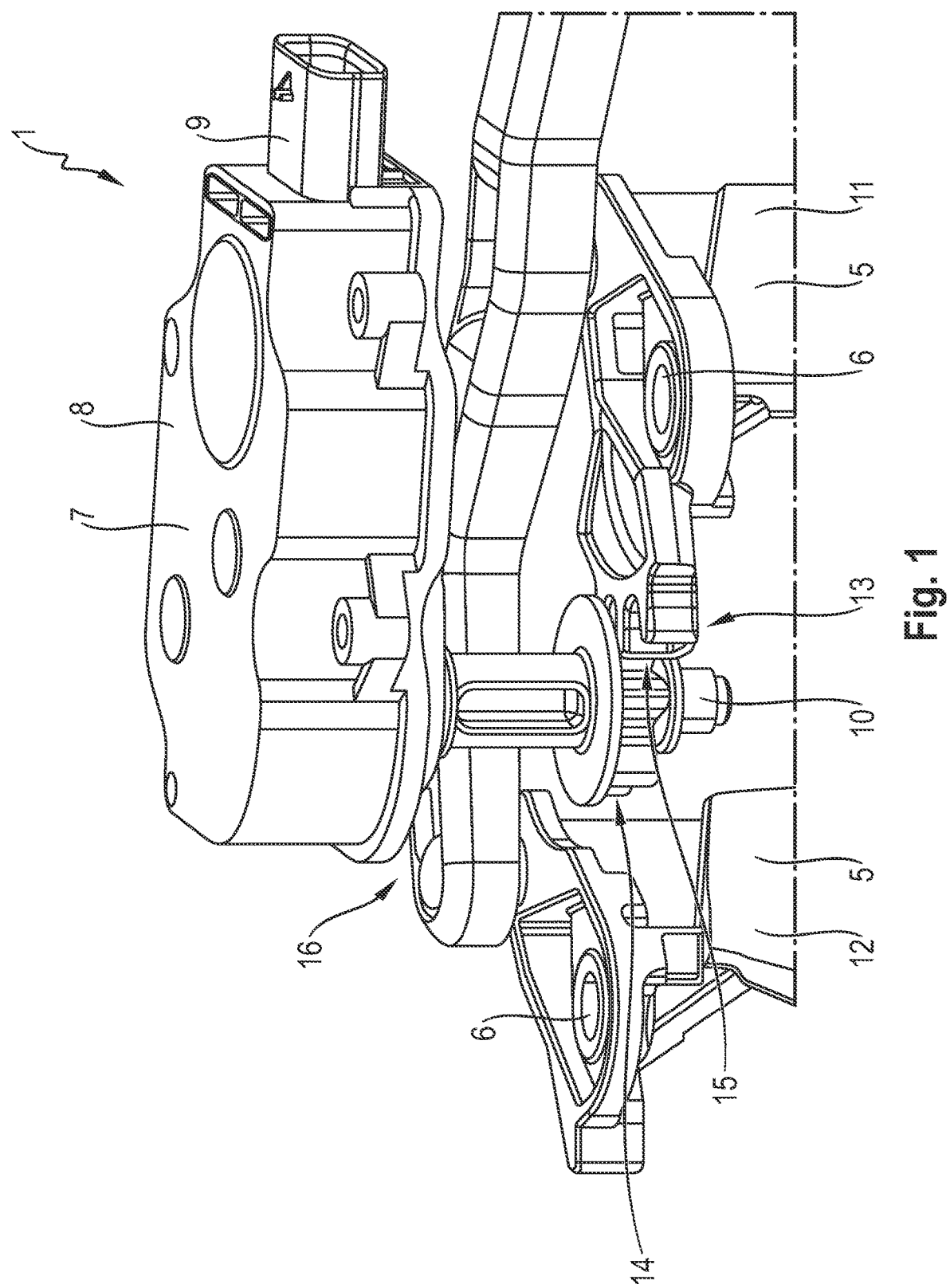

| | | | | |
|---|---|---|---|---|
| 5,954,579 | A * | 9/1999 | Masui | B60H 1/3414 |
| | | | | 454/285 |
| 9,254,742 | B2 | 2/2016 | Chappex | |
| 9,513,027 | B2 * | 12/2016 | Londiche | C21D 9/0087 |
| 9,834,064 | B2 * | 12/2017 | Wissmueller | F16K 31/041 |
| 10,131,210 | B2 * | 11/2018 | Belzons | B60H 1/3421 |
| 10,752,088 | B2 * | 8/2020 | Stoia | B60K 35/10 |
| 11,065,939 | B2 * | 7/2021 | Lee | F24F 11/89 |
| 11,648,824 | B1 * | 5/2023 | Ticu | B60H 1/3421 |
| | | | | 454/155 |
| 2005/0042982 | A1 * | 2/2005 | Okada | B60H 1/3421 |
| | | | | 454/284 |
| 2010/0263401 | A1 * | 10/2010 | Sakakibara | B60H 1/3421 |
| | | | | 62/408 |
| 2013/0149952 | A1 * | 6/2013 | Demerath | B60H 1/3421 |
| | | | | 454/155 |
| 2013/0178141 | A1 * | 7/2013 | Hoke | B60H 1/3414 |
| | | | | 454/237 |
| 2014/0315478 | A1 * | 10/2014 | Kim | B60H 1/3421 |
| | | | | 454/155 |
| 2017/0297424 | A1 | 10/2017 | Moreira et al. | |
| 2019/0351744 | A1 * | 11/2019 | Lee | F24F 11/89 |
| 2021/0316598 | A1 * | 10/2021 | Pacher | B60H 1/3421 |
| 2022/0009314 | A1 * | 1/2022 | Demerath | F24F 13/15 |
| 2022/0097489 | A1 * | 3/2022 | Tang | B60H 1/3414 |
| 2022/0281292 | A1 * | 9/2022 | Gomez Bravo Manzo | |
| | | | | B60H 1/3421 |

FOREIGN PATENT DOCUMENTS

| | | |
|---|---|---|
| DE | 102017107222 A1 | 10/2018 |
| DE | 102020120614 A1 | 2/2022 |

\* cited by examiner

FIN ARRANGEMENT OF A COOLING AIR OPENING

CROSS-REFERENCE TO RELATED APPLICATION

This application claims priority to German Patent Application No. 10 2022 102 889.5, filed Feb. 8, 2022, the content of such application being incorporated by reference herein in its entirety.

FIELD OF THE INVENTION

The invention relates to a fin arrangement of a cooling air opening, in particular of a bow of a motor vehicle.

BACKGROUND OF THE INVENTION

In motor vehicles, the flow of air into a cooling air opening for the flow against a heat exchanger arranged downstream of the cooling air opening has been known for a very long time. Modern motor vehicles have fin arrangements having adjustable fins in order to control the amount of air flowing through the cooling air opening with respect to the cooling air demand in order to keep the air resistance as low as possible, which has a favorable effect on the CO2 emission or the range. For example, the cooling air opening may be completely closed by the fins or may, on the other hand, be opened. A single drive is provided for actuating the fins, wherein this drive acts directly only on one fin and drives this one fin directly, while the plurality of fins are connected to one another by a coupling rod so that driving the one directly driven fin also indirectly drives the other fins. Fin arrangements having adjustable fins have become known through DE 10 2014 114 068 A1, which is incorporated by reference herein, for example.

Depending on the external conditions, such as vehicle speed, fin size, degree of soiling of the bearings of the fins, etc., different forces act on the individual fins so that the exertion of force or the required torque can vary between very different values. For example, in the case of new and unsoiled bearings, the force on the fins due to the incoming air is the greatest at the maximum travel speed of the motor vehicle. All these different acting forces must be counteracted by the drive in order to be able to adjust the fins at any time.

In the fin arrangement of DE 10 2014 114 068 A1, which is incorporated by reference herein, the drive acts directly on the driven fin, wherein the plurality of fins are connected to one another by a rigid coupling rod. As a result, the maximum torque to be applied by the drive is relevant to the adjustment of the fins at maximum external force application. Under particular conditions, it is thus possible for the external acting forces to increase so sharply that the drive cannot always ensure the adjustment of the fins.

SUMMARY OF THE INVENTION

Described herein is a fin arrangement of a cooling air opening, in which the adjustment of the fins of the fin arrangement to open or close the cooling air opening is enabled even under unfavorable external conditions. Also described is a motor vehicle having at least one improved fin arrangement of a cooling air opening.

One exemplary embodiment of the invention relates to a fin arrangement of a cooling air opening with a number of fins, wherein the fins are arranged in a rotatably mounted manner adjacent to the cooling air opening, wherein a drive is provided, which is directly coupled to a first fin of the fins for directly driving the first fin, and wherein the first fin is coupled to at least one second fin of the fins or to a plurality of second fins of the fins for indirectly driving the second fins, characterized in that a reduction gear or a first coupling mechanism is arranged and connected between the drive and the first fin and/or that a second coupling mechanism is connected between the first directly driven fin and at least one second indirectly driven fin and/or that a third coupling mechanism is connected between at least one second indirectly driven fin and at least one further second indirectly driven fin. The provided reduction between the drive and the directly driven first fin and/or between the directly driven first fin and an indirectly driven second fin and/or between an indirectly driven second fin and a further indirectly driven second fin can thus increase the torque, which also allows the fins to be adjusted under unfavorable external conditions.

In an exemplary embodiment, it is expedient for the reduction gear to be a gear mechanism and/or a disk cam mechanism. In the case of a gear mechanism, it is furthermore advantageous if the gear mechanism comprises a first gear wheel arranged on the output side of the drive and comprising a second gear wheel which is part of the first fin.

In a further exemplary embodiment, it is also advantageous for the first coupling mechanism and/or the second coupling mechanism and/or the third coupling mechanism to be a four-link mechanism. As a result, desired kinematics of the fin movement can be generated and, in the case of large structural widths of the cooling air opening or the fin widths, larger distances can also be bridged.

In a further exemplary embodiment, it is also expedient if the first coupling mechanism is designed as a reduction gear, and/or the second coupling mechanism and/or the third coupling mechanism is designed as a step-up gear and/or as a reduction gear. The required torque distribution can thus be specifically carried out.

In a further exemplary embodiment, it is also advantageous if the first and second fins are respectively arranged adjacent in a row next to one another, with a first edge-side fin and a second edge-side fin and, where applicable, with at least one central fin arranged between the two edge-side fins. As a result, a kind of fin curtain can be formed, which brings about a substantially uniform surface in the closed state of the cooling air opening so that good aerodynamics can be achieved.

It is advantageous if the directly driven first fin is one of the edge-side fins or a central fin. In particular in the case of a central fin, the arrangement can be designed effectively with respect to the installation space.

It is also advantageous in a further exemplary embodiment if the directly driven first fin is arranged as a central fin and is connected by means of a respective second coupling mechanism to two indirectly driven second fins arranged adjacent to it. This facilitates torque transmission, in particular if more than three fins are provided. A rather symmetrical arrangement of the coupling mechanisms is also achieved.

Advantageously, in a further exemplary embodiment, it is the same if at least one indirectly driven second fin is connected by means of a third coupling mechanism to a further indirectly driven second fin. In this way, the number of fins can be increased as needed in the case of a large air inlet opening, wherein the further indirectly driven second fin can respectively be driven by the adjacent second fin via the third coupling mechanism.

It is also expedient if at least one second cooling air opening is provided, which is closed or opened by at least one third fin, wherein the at least one third fin is connected, in a driven manner, by means of a coupling mechanism, in particular to a first fin or a second fin. Thus, not only the fins of a cooling air opening but also two or more cooling air openings can be coupled to one another in order to be actuated and adjusted overall by only one drive.

An exemplary embodiment of the invention relates to a motor vehicle having at least one cooling air opening and having a fin arrangement, in particular having two cooling air openings and having two fin arrangements, according to the present invention. The two cooling air openings can, for example, be arranged symmetrically on a vehicle bow of the motor vehicle.

BRIEF DESCRIPTION OF THE DRAWING FIGURES

Figure 2:
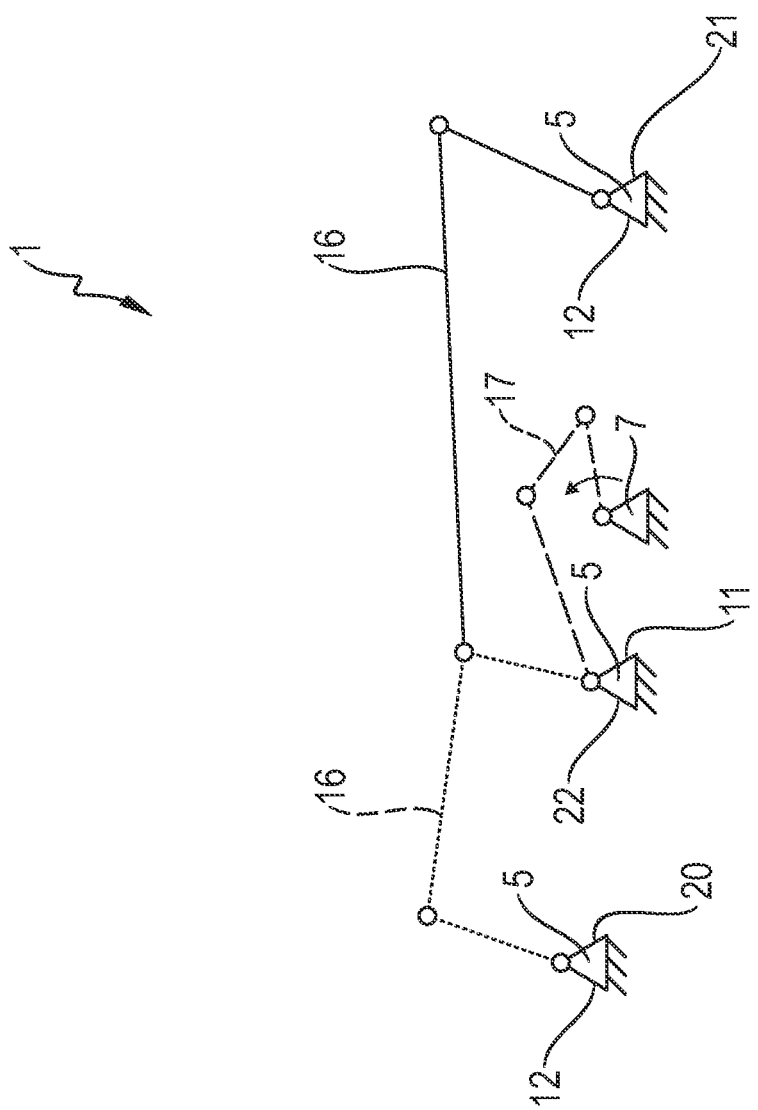
Figure 3:
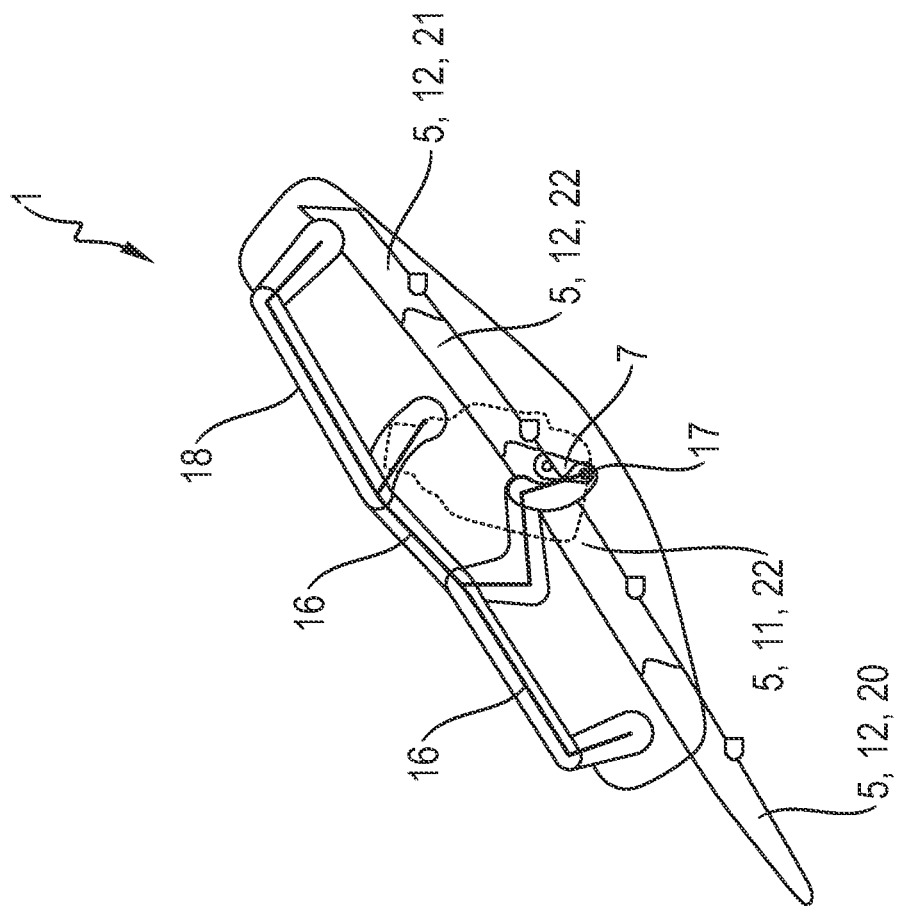
Figure 4:
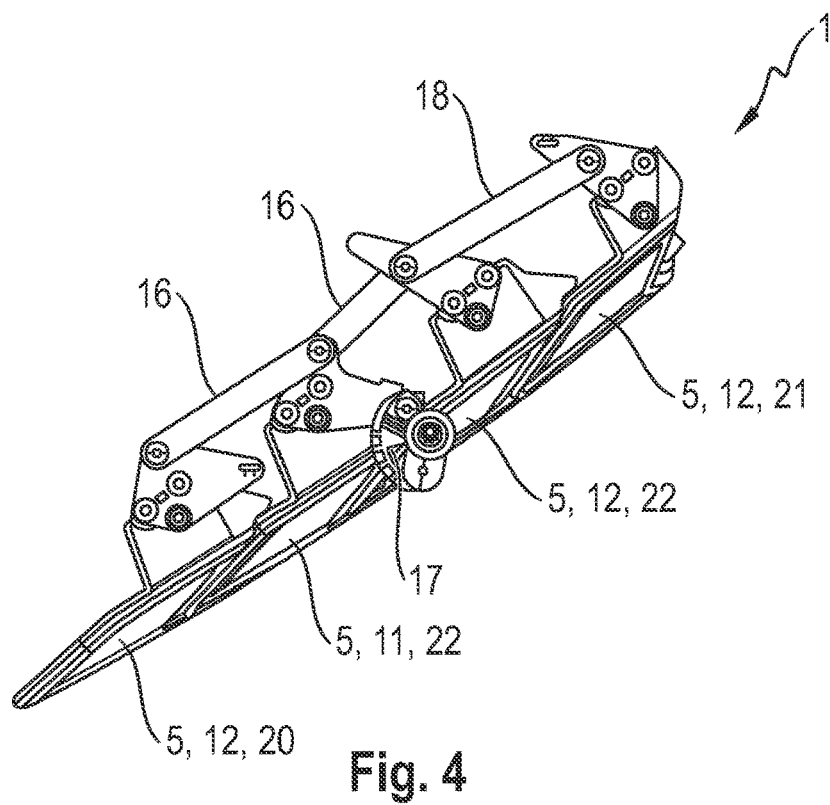
Figure 5:
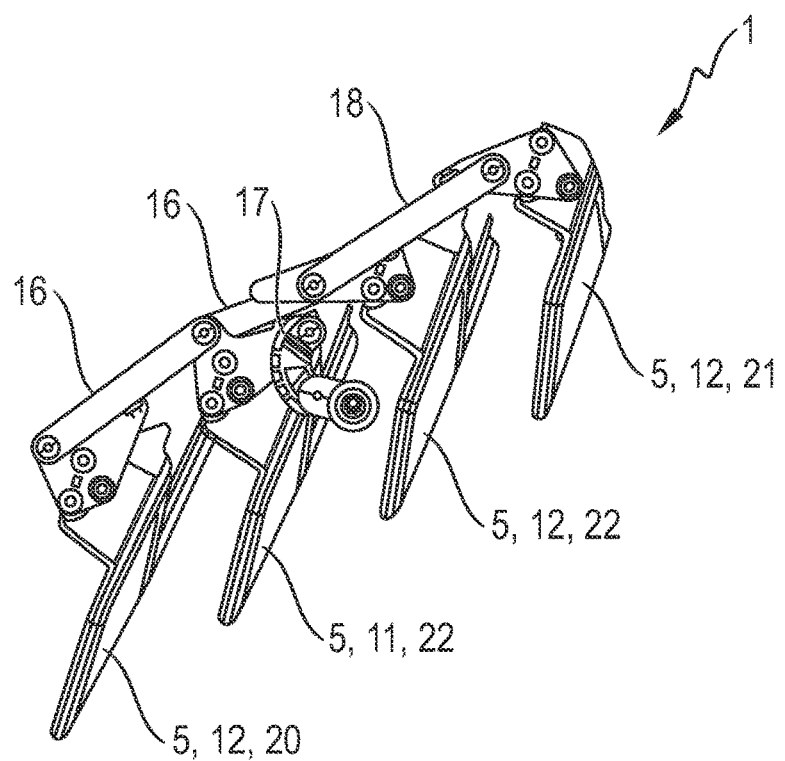
Figure 6:
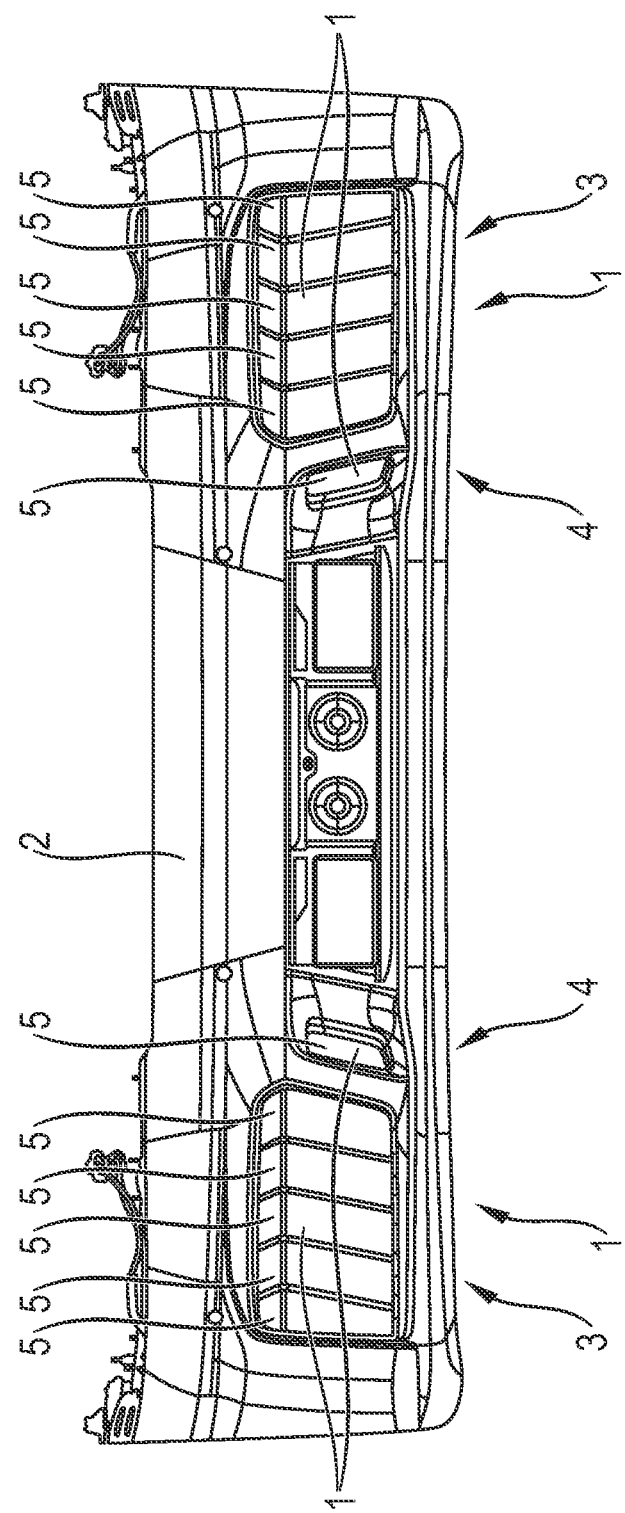

The invention is described in detail below using an exemplary embodiment with reference to the drawings. The drawings show:

FIG. 1 a schematic partial illustration of a first exemplary embodiment of a fin arrangement according to aspects of the invention with a drive, FIG. 2 a schematic illustration of a second exemplary embodiment of a fin arrangement according to aspects of the invention, FIG. 3 a schematic illustration of a third exemplary embodiment of a fin arrangement according to aspects of the invention, FIG. 4 a schematic illustration of a fourth exemplary embodiment of a fin arrangement according to aspects of the invention, FIG. 5 a schematic illustration of a fourth exemplary embodiment of a fin arrangement according to aspects of the invention, and FIG. 6 a view of a bow of a motor vehicle having two fin arrangements.

DETAILED DESCRIPTION OF THE INVENTION

The invention relates to a fin arrangement 1 of a cooling air opening, in particular of a bow 2 of a motor vehicle. By way of example and schematically for the purposes of illustrating the general circumstances, FIG. 6 shows a bow 2 of a motor vehicle, in which four cooling air openings 3, 4 are shown, wherein two cooling air openings 3, 4 each are arranged on the right and left sides in the bow 2, to which are assigned one fin arrangement 1 per two cooling air openings 3, 4. In principle, the invention relates to a fin arrangement 1 having a number of fins 5 of at least one cooling air opening 3, 4. FIGS. 1 to 5 show various views of exemplary embodiments.

FIG. 1 shows a schematic partial illustration of a fin arrangement 1 of a cooling air opening with a number of fins 5. In FIG. 1, only two fins 5 are shown by way of example, wherein further fins 5 can be arranged adjacent to the two fins shown, as is also shown in FIG. 6. The cooling air opening 3, 4 is also not shown in FIG. 1. In this regard, reference is made by way of example to the cooling air openings 3, 4 of FIG. 6.

The fins 5 are arranged in a rotatably mounted manner adjacent to the cooling air opening 3, 4. For this purpose, the fins 5 are rotatably mounted by means of the bearings 6 about an axis of rotation.

A drive 7 is provided, which is designed as an electromotive actuator, for example. The drive 7 comprises a housing 8 in which, for example, an electric motor and an electronic control unit are provided. For example, a plug connector 9 is provided for the electrical connection and for controlling the drive 7. On the output side, the drive 7 comprises a shaft 10, which can be rotated in a driven manner.

For directly driving the first fin 11, a first fin 11 of the fins 5 is directly coupled to this drive 7.

For indirectly driving the second fins 12, the first fin 11 is coupled to at least one second fin 12 of the fins 5 or to a plurality of second fins 12 of the fins 5.

For driving the fins 5, a reduction gear 13 or a first coupling mechanism is connected between the drive 7 and the first fin 11. In FIG. 1, a reduction gear 13 is provided, in which a first gear wheel 14 is arranged on the shaft 10 and meshes with a second gear wheel 15 connected to the first fin 11 or formed integrally therewith.

The alternative design with the first coupling mechanism is shown schematically in FIG. 2.

Alternatively or in addition to the reduction gear 13 or the coupling mechanism between the drive 7 and the first fin 11, a second coupling mechanism 16 may be connected between the first directly driven fin 11 and at least one second indirectly driven fin 12 and/or a third coupling mechanism may be connected between at least one second indirectly driven fin 12 and at least one second indirectly driven fin 12.

In this case, the reduction gear 13 may be a gear mechanism, as shown in FIG. 1, and/or may be a disk cam mechanism.

FIG. 1 shows that the second coupling mechanism 16 is a four-link mechanism. Alternatively or additionally, the third coupling mechanism and/or the first coupling mechanism may be designed as a four-link mechanism.

It is advantageous for the torque determination if the first coupling mechanism between drive 7 and first fin 11 is designed as a reduction gear. Additionally or alternatively, the second coupling mechanism 16 and/or the third coupling mechanism may also be designed as a step-up gear and/or as a reduction gear.

FIG. 2 shows a schematic illustration of a second exemplary embodiment of a fin arrangement 1 having a first directly driven fin 11 and having two indirectly driven fins 12. The directly driven fin 11 is driven by the drive 7 via a first coupling mechanism 17. The first coupling mechanism 17 is a four-link mechanism.

Starting from the first driven fin 11, the second indirectly driven fins 12 are driven via second coupling mechanisms 16, which are likewise designed as four-link mechanisms.

FIG. 2 shows that the first and second fins 11, 12 are each arranged adjacent in a row next to one another. By way of example, only three fins 11, 12 are arranged in the example of FIG. 2. However, more or less fins 11, 12 may be provided, e.g., two fins 11, four fins 11, 12, five fins 11, 12 or more fins 11, 12.

The arrangement of the fins 11, 12 is designed in such a way that a first edge-side fin 20 and a second edge-side fin 21 are provided, wherein furthermore optionally, where applicable, at least one central fin 22 is provided arranged between the two edge-side fins 20, 21. In the exemplary embodiment shown in FIG. 2, the arrangement of the fins 11, 12 is designed such that a first edge-side fin 20 and a second edge-side fin 21 are provided, wherein a central fin 22 is arranged between the two edge-side fins 20, 21.

The directly driven first fin 11 is arranged as a central fin with two indirectly driven second fins 12 arranged adjacent to it and connected to the first fin 11 by means of a respective second coupling mechanism 16.

Alternatively, the directly driven first fin 11 could also be one of the edge-side fins 12.

FIG. 3 shows a schematic illustration of a third exemplary embodiment of a fin arrangement 1 having a first directly driven fin 11 and having three indirectly driven fins 12. The fins 11, 12 are arranged in the position closing the cooling air opening. The directly driven fin 11 is driven by the drive 7 via a first coupling mechanism 17. The first coupling mechanism 17 is a four-link mechanism.

Starting from the first driven fin 11, the two directly adjacent second indirectly driven fins 12 are driven via second coupling mechanisms 16, which are likewise designed as four-link mechanisms.

The indirectly driven fin 12, which is not arranged directly to the directly driven fin 11 and is arranged on the right edge, is driven via a further third coupling mechanism 18 by the indirectly driven fin 12 arranged adjacent to it.

FIG. 3 thus shows that the first and second fins 11, 12 are each arranged adjacent in a row next to one another. By way of example, only four fins 11, 12 are arranged in the example of FIG. 3. However, more or less fins 11, 12 may be provided, e.g., two fins 11, four fins 11, 12, five fins 11, 12 or more fins 11, 12.

The arrangement of the fins 11, 12 is designed in such a way that a first edge-side fin 20 and a second edge-side fin 21 are provided, wherein two arranged central fins 22 are provided between the two edge-side fins 20, 21. The directly driven first fin 11 is arranged as a central fin with two indirectly driven second fins 12 arranged adjacent to it and connected to the first fin 11 by means of a respective second coupling mechanism 16. The indirectly driven fin 12, 21, which is not arranged directly to the directly driven fin 11 and is arranged on the right edge, is driven via a further third coupling mechanism 18 by the indirectly driven fin 12 arranged adjacent to it.

Thus, in the exemplary embodiment of FIG. 3, the design is such that at least one indirectly driven second fin 12 is connected to a further indirectly driven second fin 12 by means of a third coupling mechanism 18.

FIGS. 4 and 5 each show a schematic illustration of a fourth exemplary embodiment of a fin arrangement 1 having a first directly driven fin 11 and having three indirectly driven fins 12. The fins 11, 12 are arranged in FIG. 4 in the position closing the cooling air opening and in FIG. 5 in the position opening the cooling air opening. The directly driven fin 11 is driven by the drive 7 via a coupling mechanism 17 designed as a reduction gear.

Starting from the first driven fin 11, the two directly adjacent second indirectly driven fins 12 are driven via second coupling mechanisms 16, which are likewise designed as four-link mechanisms.

The indirectly driven fin 12, which is not arranged directly to the directly driven fin 11 and is arranged on the right edge, is driven via a further third coupling mechanism 18 by the indirectly driven fin 12 arranged adjacent to it.

FIGS. 4 and 5 thus show that the first and second fins 11, 12 are each arranged adjacent in a row next to one another. By way of example, four exemplary fins 11, 12 are arranged in the example of FIGS. 4 and 5. However, more or less fins 11, 12 may be provided, e.g., two fins 11, four fins 11, 12, five fins 11, 12 or more fins 11, 12.

The arrangement of the fins 11, 12 is designed in such a way that a first edge-side fin 20 and a second edge-side fin 21 are provided, wherein two arranged central fins 22 are provided between the two edge-side fins 20, 21. The directly driven first fin 11 is arranged as a central fin 22 with two indirectly driven second fins 12 arranged adjacent to it and connected to the first fin 11 by means of a respective second coupling mechanism 16. The indirectly driven fin 12, 21, which is not arranged directly to the directly driven fin 11 and is arranged on the right edge, is driven via a further third coupling mechanism 18 by the indirectly driven fin 12 arranged adjacent to it.

Thus, in the exemplary embodiment of FIG. 3, the design is such that at least one indirectly driven second fin 12 is connected to a further indirectly driven second fin 12 by means of a third coupling mechanism 18.

FIG. 6 shows that at least one second cooling air opening 4 is in each case provided in addition to the respective cooling air opening 3, which is closed or opened by at least one third fin 5, wherein the at least one third fin 5 is connected, in a driven manner, by means of a coupling mechanism 16, 18, which is not shown, in particular to a first fin 11 or to a second fin 12.

FIG. 6 shows a bow 2 of a motor vehicle having at least one cooling air opening 3, 4 and having a fin arrangement 1, wherein, by way of example, a bow having two cooling air openings 3, 4 and having two fin arrangements 1 is disclosed, and specifically even four cooling air openings 3, 4 which are controlled by two fin arrangements 1.

LIST OF REFERENCE SIGNS

1 Fin arrangement
2 Bow
3 Cooling air opening
4 Cooling air opening
5 Fin
6 Bearing
7 Drive
8 Housing
9 Plug connection
10 Shaft
11 First fin
12 Second fin
13 Reduction gear
14 First gear wheel
15 Second gear wheel
16 Second coupling mechanism
17 First coupling mechanism
18 Third coupling mechanism
20 First edge-side fin
21 Second edge-side fin
22 Central fin

The invention claimed is:

1. A fin arrangement for a cooling air opening, said fin arrangement comprising:
   a plurality of fins arranged in a rotatably mounted manner adjacent to the cooling air opening,
   a drive directly coupled to a first fin of the plurality of fins for directly driving the first fin, and wherein the first fin is coupled to at least one second fin of the plurality of fins or to a plurality of second fins of the plurality of fins for indirectly driving the second fins,
   wherein the fin arrangement further comprises:
   (i) a first coupling mechanism arranged and connected between the drive and the first fin, wherein the first coupling mechanism is a reduction gear disposed on the first fin, and the reduction gear is a pear mechanism and/or a disk cam mechanism, (ii) a second coupling mechanism connected between the first directly driven fin of the plurality of fins and the at least one second fin of the plurality of fins, and (iii) a third coupling mechanism connected between the at least one second fin of the plurality of fins and at least one further second fin of the plurality of fins.

2. The fin arrangement according to claim 1, wherein the first coupling mechanism and/or the second coupling mechanism and/or the third coupling mechanism is a four-link mechanism.

3. The fin arrangement according to claim 1, wherein the second coupling mechanism and/or the third coupling mechanism is a step-up gear and/or a reduction gear.

4. The fin arrangement according to claim 1, wherein the plurality of fins are arranged adjacent in a row next to one another, and the plurality of fins comprises a first edge-side fin, a second edge-side fin and at least one central fin arranged between the two edge-side fins.

5. The fin arrangement according to claim 4, wherein the directly driven first fin constitutes either one of the edge-side fins or the central fin.

6. The fin arrangement according to claim 4, wherein the directly driven first fin constitutes the central fin and the first fin is connected by means of the second coupling mechanism to two of the second fins arranged adjacent to the first fin.

7. The fin arrangement according to claim 6, wherein at least one of the second fins is connected to a further second fin by means of the third coupling mechanism.

8. The fin arrangement according to claim 1, further comprising at least one third fin that is configured for closing or opening at least one second cooling air opening, wherein the at least one third fin is connected, in a driven manner and by means of a coupling mechanism, either to the first fin or to the second fin.

9. A motor vehicle comprising the at least one cooling air opening and the fin arrangement according to claim 1.

10. The motor vehicle of claim 9 comprising two of said cooling air openings and two fin arrangements.

11. The fin arrangement according to claim 1, wherein the reduction gear is a disk cam mechanism.

12. The fin arrangement according to claim 1, wherein the gear mechanism comprises gear teeth that are disposed about a bearing of the first fin.

13. The fin arrangement according to claim 1, wherein the gear teeth are meshed with mating gear teeth that are disposed on an output shaft of the drive.

* * * * *